United States Patent [19]

Watanabe et al.

[11] Patent Number: 4,529,242
[45] Date of Patent: Jul. 16, 1985

[54] WINDSHIELD ASSEMBLY FOR MOTORCYCLES

[75] Inventors: Masaki Watanabe, Saitama; Akio Yagasaki; Kazuto Chisaka, both of Tokyo, all of Japan

[73] Assignee: Honda Giken Kogyo Kabushiki Kaisha, Tokyo, Japan

[21] Appl. No.: 424,288

[22] Filed: Sep. 27, 1982

[30] Foreign Application Priority Data

Oct. 16, 1981 [JP] Japan .................. 56-153701[U]

[51] Int. Cl.³ .............. B62J 17/04; B62D 25/14
[52] U.S. Cl. .................. 296/78.1; 296/70; 180/90; 280/289 S; 15/250.3
[58] Field of Search ......... 296/39 A, 70, 78.1; 180/90; 15/250 R, 250.3, 250.31; 280/289 S; D12/182

[56] References Cited

U.S. PATENT DOCUMENTS

| | | | |
|---|---|---|---|
| 1,615,290 | 1/1927 | Orr | 15/250.3 |
| 4,066,291 | 1/1978 | Hickman | 296/78.1 |
| 4,083,595 | 4/1978 | Maier | 296/39 A |
| 4,355,838 | 10/1982 | Hickman | 296/78.1 |
| 4,372,602 | 2/1983 | Tsuchiya et al. | 296/78.1 |

FOREIGN PATENT DOCUMENTS

| | | | |
|---|---|---|---|
| 2408946 | 9/1975 | Fed. Rep. of Germany | 280/289 S |
| 483782 | 8/1953 | Italy | 296/78.1 |

Primary Examiner—Robert B. Reeves
Assistant Examiner—Dennis H. Pedder
Attorney, Agent, or Firm—Irving M. Weiner; Pamela S. Burt

[57] ABSTRACT

A windshield assembly for motorcycles. A wiper motor is disposed in a lower position inside a windshield member which extends upwardly from a fairing member, and a wiper switch is mounted on an ornamental panel member which is disposed over the motor, and further a wiper arm is coupled to the motor. These windshield components are integrally assembled together in advance, and the assembled body is mounted to a vehicle body through a mounting stay.

Reduction in weight, ensuring of the operating accuracy, improvement of the external appearance and decrease of the mounting time is attained.

9 Claims, 12 Drawing Figures

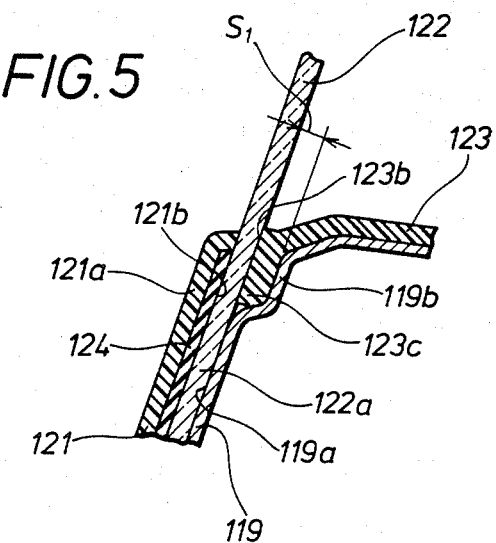
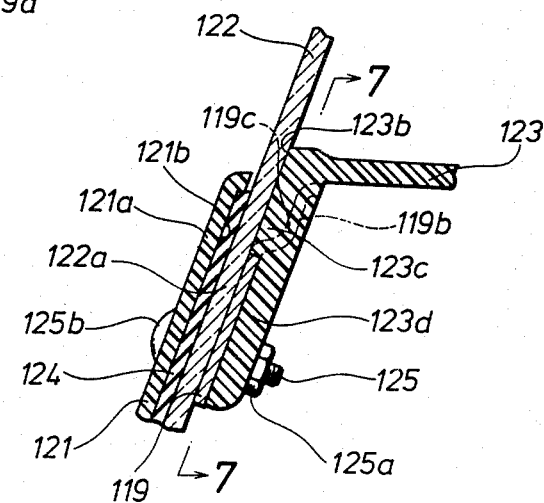
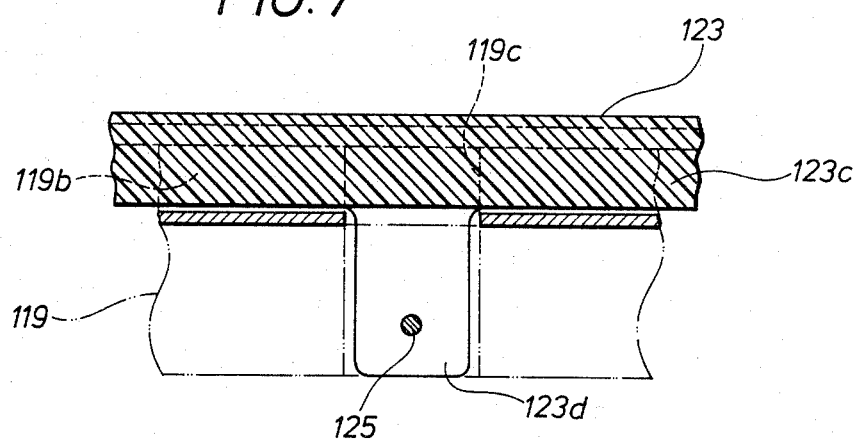

WINDSHIELD ASSEMBLY FOR MOTORCYCLES

BACKGROUND OF THE INVENTION

1. Field of the Invention

The present invention relates to a windshield assembly for motorcycles and more particularly to a windshield assembly having a wiper mechanism for motorcycles, three-wheeled motor vehicles and the like, and a method of assembling the windshield assembly and mounting same on a vehicle.

2. Description of Relevant Art

A windshield assembly for motorcycles comprising an upwardly extending windshield member mounted in front of a handlebar, a wiper motor attached to an upper part of the windshield member and a wiper arm for supporting a wiper blade supported pivotably from above, is known.

In such a conventional windshield assembly for motorcycles, because the wiper motor is heavy relative to the windshield member which is supported at its lower portion, it is necessary to additionally provide a motor supporting stay, and consequently it has been difficult to attain a favorable external appearance. In view of this consideration, if the wiper motor is supported directly by the windshield without the additional provision of a supporting stay, it becomes necessary to increase the rigidity of the windshield and hence to thicken the shield, thus resulting in an increase in weight, which is contrary to the demand for reduction in weight of motorcycles.

Moreover, due to the size of the wiper motor, it is desirable to suitably dispose it while taking into account mounting space and its shielding thereof from an external view. Additionally, it is preferable that a wiper switch for manually turning on and off the wiper motor be disposed in a position where switching operation thereof can be performed easily as necessary.

Furthermore, if the windshield member is mounted on a fairing member, it is undesirable with respect to working efficiency to attach the fairing member and the wiper mechanism separately to the vehicle body through separate stays, and in order to maintain the contact angle of the blade of the wiper mechanism with the surface of the shield member and the mounting angle of the driving shaft of the wiper motor at a predetermined accuracy, it is desirable to avoid disassembly and assembly of the wiper mechanism itself, and if possible, to assemble the fairing member and the windshield member together in advance. Further, if an inner panel (ornamental panel) member mounted between the fairing member and the handlebar is also assembled together with the aforesaid members in advance, it becomes possible to improve the required man-hour time for mounting such assembled members to the vehicle body.

The present invention effectively overcomes the foregoing drawbacks of the prior art while meeting the demand mentioned above.

SUMMARY OF THE INVENTION

According to the present invention, there is provided a windshield assembly in a motorcycle having a vehicle body and a handlebar attached to a front part of the vehicle body, which windshield assembly comprises a fairing member supported by the vehicle body in front of the handlebar, an upwardly extending windshield member mounted on the fairing member and permitting substantially a front view therethrough, an ornamental panel member extending rearwardly from the lower portion of the windshield member, a manual switch mounted on the upper surface of the ornamental panel member, a motor disposed below the ornamental panel member and capable of being turned on and off by the manual switch, a wiper coupled to the motor and attached to the windshield member and capable of wiping the front surface of the windshield member, and a stay member fixed to the vehicle body to support the motor.

It is an object of the present invention to provide a windshield assembly for motorcycles having characteristics such that the reduction in weight of a windshield member and a high operating accuracy of a wiper can be attained and the windshield member is assembled together with a fairing member and an inner panel member to constitute an integrally assembled member having a favorable external appearance while attaining a desirable arrangement of a wiper motor and a wiper switch, thereby permitting the integrally assembled member to be mounted to a vehicle body as necessary in a simple manner, which greatly contributes to a remarkable improvement in the mounting time.

Preferred embodiments of the present invention will be described in detail hereinunder with reference to the accompanying drawings, from which further features, objects and advantages of the present invention will become apparent.

BRIEF DESCRIPTION OF THE DRAWINGS

FIG. 5 is an enlarged sectional view taken along line 5—5 of FIG. 4.

FIG. 6 is an enlarged sectional view taken along line 6—6 of FIG. 4.

FIG. 7 is an enlarged sectional view taken along line 7—7 of FIG. 6.

DETAILED DESCRIPTION OF PREFERRED EMBODIMENTS

Figure 1:
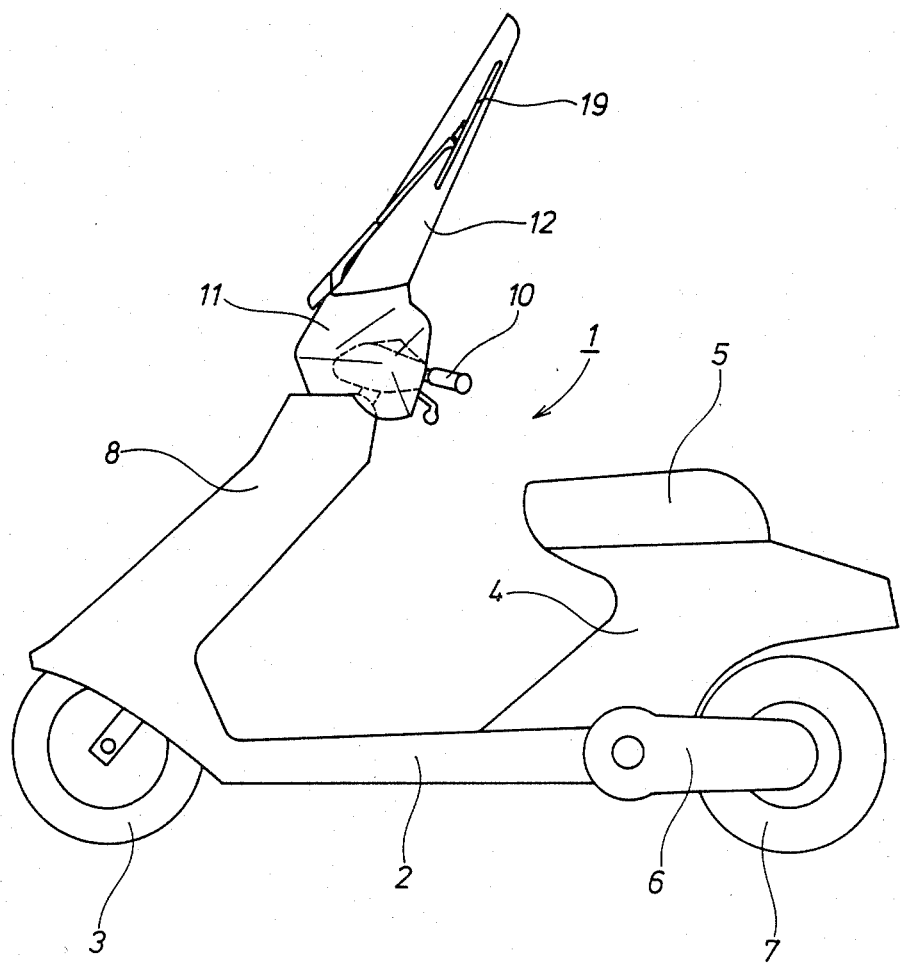
FIG. 1 is a schematic side view of a motorcycle having a windshield assembly according to a first embodiment of the present invention.
Figure 2:
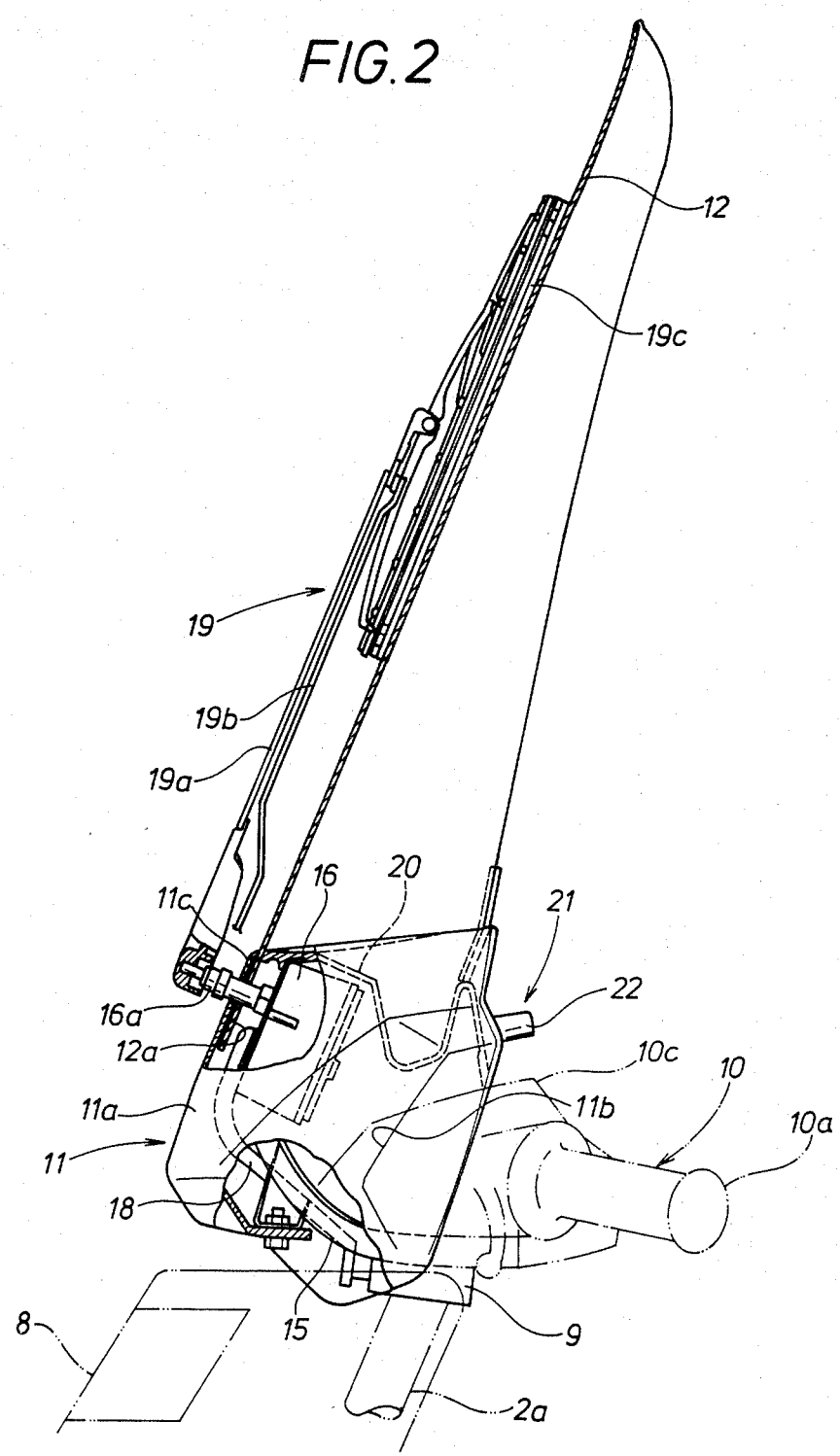
FIG. 2 is an enlarged side view of the windshield assembly shown in FIG. 1, partly broken away to show principal portions.
Figure 3:
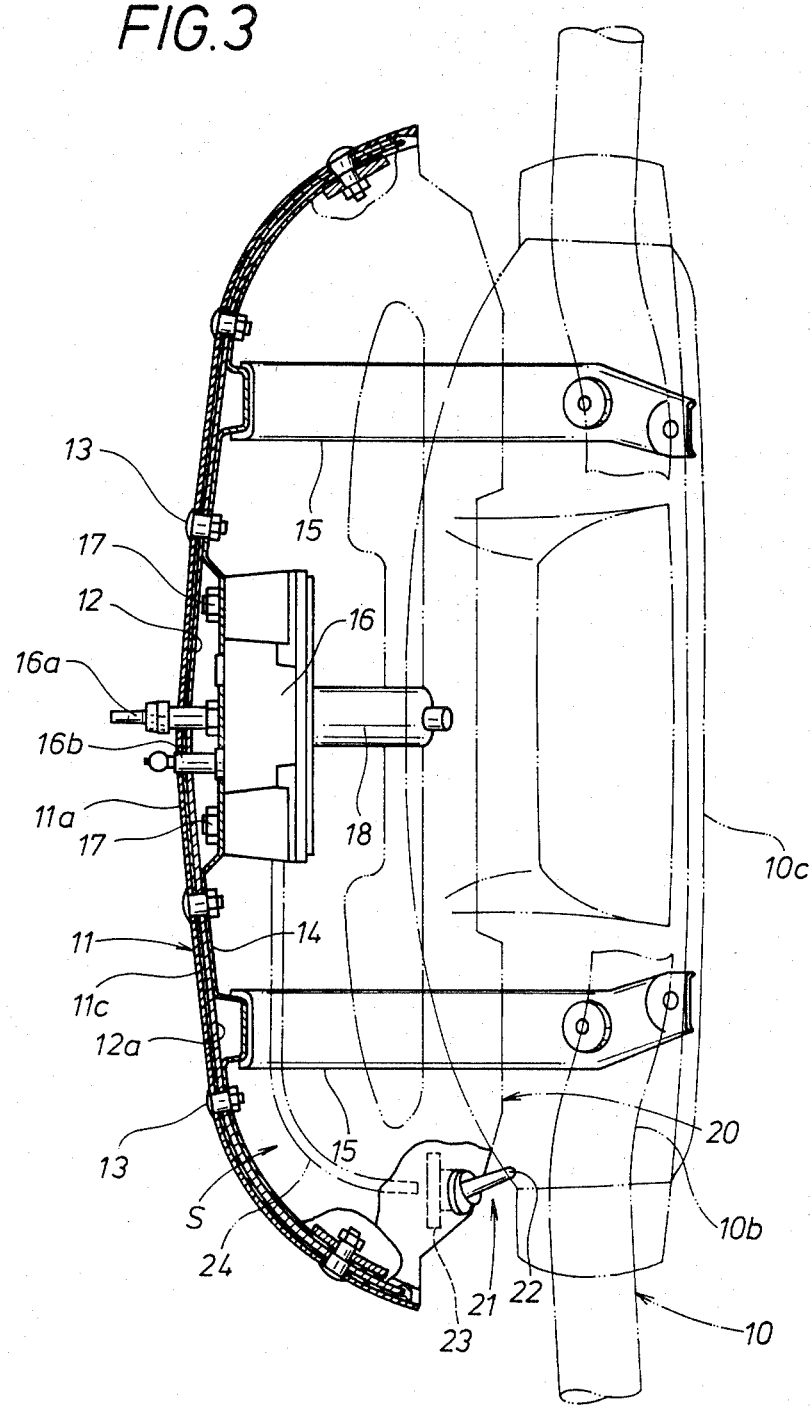
FIG. 3 is an enlarged transverse sectional view of the windshield assembly shown in FIG. 1.

Referring first to FIGS. 1 through 3, reference numeral 1 represents the entirety of a motorcycle, and a front wheel 3 is attached to a lower part of the front portion of a vehicle body 2 of the motorcycle 1, while from the rear portion of the vehicle body 2 there extends upwardly a seat post 4 which supports a seat 5, with the front portion of a power unit 6 which supports a rear wheel 7 as a driving wheel being secured for swinging motion to a lower part of the rear portion of the vehicle body 2. At the front portion of the vehicle body 2 there extends upwardly a front cover 8, which also serves as a leg shield, in a rearwardly inclined manner. A transversely extending handlebar 10 is mounted on a bracket 9 secured to a steering stem (not shown) which passes through a head tube 2a. The handlebar 10 is provided at both ends thereof with grips 10a, and as shown in FIG. 3, a handlebar pipe 10b positioned between the grips 10a is covered with a cover 10c which incorporates a meter unit, etc. Furthermore, a fairing 11 is disposed in front of the handlebar 10, and is provided with a body 11a positioned intermediately in the transverse direction and grip cover portions 11b which, as shown in FIG. 2, extend to the right and left with respect to the body 11a, the body 11a and the grip cover portions 11b being integrally molded from a synthetic resin. On the fairing 11 there extends upwardly a transparent windshield 12 made of a synthetic resin. A lower portion 12a of the windshield 12 is overlapped with an upper portion 11c of the fairing body 11a, and both are secured together with a plurality of machine screws 13 as shown in FIG. 3 and further secured, also by means of the machine screws 13, to a support frame 14 which comprises a steel plate or the like and which is disposed on the back of the lower portion 12a of the windshield. The frame 14 is supported by tip ends of right and left side stays 15 whose base portons are fixed to the handlebar pipe 10b in positions more inwardly than the grips.

As is apparent from FIGS. 2 and 3, a wiper motor 16 is mounted at an intermediate or upper part and centrally in the transverse direction of the rear side of the fairing body 11a. The motor 16 is fixed with screws 17 to a central part in the transverse direction of the frame 14 (i.e., the motor 16 is fixed to the windshield 12, through the frame 14) and is also supported by a tip portion of a center stay 18 whose base portion is fixed to the steering stem bracket 9, whereby the motor 16 is held in place firmly enough to resist a reaction force induced by its operation. Thus the motor 16 is disposed below the windshield 12, and this arrangement is preferable from the standpoint of weight balance. The central location of motor 16 in the transverse direction is further preferable with respect to balance. From the front side of the motor 16 there forwardly projects a driving shaft 16a and a guide shaft 16b through the upper portion 11c of the fairing 11 and the lower portion 12a of the windshield 12, and base portions of arms 19a and 19b of a wiper 19 are connected to the driving shaft 16a and guide shaft 16b, respectively. To the tip ends of the arms 19a and 19b is connected a blade 19c which contacts the front surface of the windshield 12.

As shown in FIG. 3, the wiper motor 16 is thus disposed within a space S formed between the handlebar 10 and the fairing 11, and mounted thereover is an ornamental panel 20 which extends transversely along the upper portion 11c of the body 11a of the fairing 11. The panel 20 covers the motor 16 and the stays 15 and 18, and a switch 21 for driving the wiper motor 16 is fixed to one side end portion of the panel 20 in a position near the handlebar grip 10a. The switch 21 has a knob 22 which projects onto the outer surface of the panel 20, and its mounting base 23, as shown in FIG. 3, faces the lower surface of the panel 20 and is connected to the motor 16 through a harness 24. Thus, because the switch 21 is disposed adjacent the handlebar grip 10a, it can be easily operated together with other switches (not shown) disposed concentratedly in inside positions with respect to the grip 10a.

In the foregoing manner, the wiper assembly, including wiper motor 16, wiper switch 21 and wiper 19, can be operably attached to the windshield assembly in advance. In assembling the windshield assembly, the wiper motor 16 is mounted in a lower position on the inner side of the windshield assembly, and the panel 20 is secured in an inner and lower portion of the windshield so as to cover the wiper motor. The wiper switch 21 is mounted on the panel 20, and the wiper 19 is mounted adjacent the front surface of the windshield and operatively coupled to the wiper motor 16 as described above. Thereafter, the windshield assembly, having the wiper assembly operatively connected therewith, is mounted to the front porton of the vehicle body such that the fairing is positioned in front of the handlebar 10 of the vehicle and the wiper motor 16 is disposed within the space S defined between the handlebar 10 and the fairing 11, with the panel 20 extending substantially proximal to the handlebar 10. As part of such mounting operation, the wiper motor 16 is secured to the vehicle body through the stay 18 which is fixed to the steering stem bracket 9.

Figure 4:
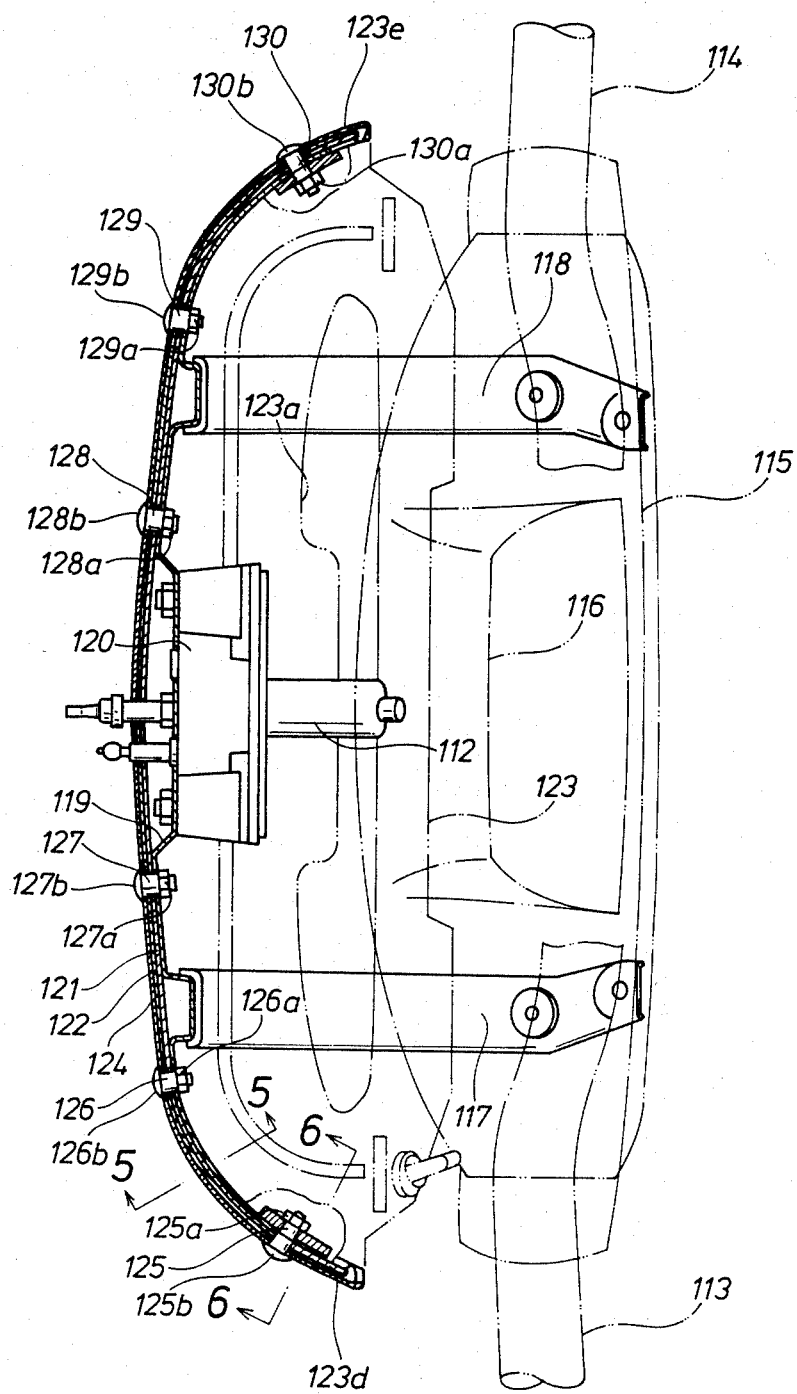
FIG. 4 is a transverse sectional view of a windshield assembly according to a second embodiment of the present invention.

Referring now to FIGS. 4 through 7, reference numeral 112 shown in FIG. 4 designates a center stay fixed at its lower end to a steering stem bracket (not shown) mounted on the upper end of a front fork (not shown), and behind the center stay 112 are disposed right and left handlebar pipes 113 and 114 which are fixed to the steering stem bracket, with meters 116 being disposed on a cover 115 for the pipes 113 and 114. To the handlebar pipes 113 and 114 are connected rear ends of forwardly extending right and left side stays 117 and 118, respectively, and a support frame 119 is attached to the front ends of the center stay 112 and side stays 117, 118. The support frame 119, which is forwardly bulged and curved in horizontal section, has its length dimension extending in the transverse direction of the vehicle body, and a wiper motor 120 is attached thereto centrally in the transverse direction of the vehicle body.

The front of the handlebar cover 115 is covered with a windshielding fairing 121, and from the fairing 121 there extends upwardly a windshield 122 which is spread in front of the driver's face. Behind the fairing 121 is disposed an ornamental panel 123 in which is formed a downwardly projecting recess 123a which serves favorably as a container. The ornamental panel 123 covers the upper surface of the wiper motor 120. The fairing 121, windshield 122 and ornamental panel 123 are fixed to the support frame 119 and thereby supported, as shown in FIGS. 5 through 7.

The mounting operation for the above-mentioned members is performed in the following manner. First, a lower portion 122a of the windshield 122 is placed on a back 121b of an upper portion 121a of the fairing 121 through a rubber member 124, then the upper portion 121a, the rubber member 124 and the lower portion 122a are fixed to a front 119a of the support frame 119, as shown in FIG. 6, with bolts 126-129 and nuts 126a-129a which are disposed centrally in the transverse direction of the vehicle body among bolts 125-130 and nuts 125a-130a provided at a total of six places as shown in FIG. 4. Head portions 125b-130b of all the bolts 125-130 do not have a groove for insertion and engagement of a tool such as a screw-driver, i.e., the head portions 125b-130b exposed to the front of the fairing 121 are smooth and hence provide a favorable appearance. The tightening operation for the bolts 126-129 and nuts 126a-129a is effected by turning the nuts 126a-129a on the back side of the fairing 121. At this time, the ornamental panel 123 is not yet mounted.

An upper portion 119b of the support frame 119 is rearwardly bent stepwise as shown in FIG. 5, and consequently there is formed a gap $S_1$ between upper portion 119b and the back 121b of the fairing, or the back of the windshield 122 because the rubber member 124 and the lower portion 122a of the windshield 122 are disposed on the back 121b in this embodiment. The gap $S_1$ is formed throughout the overall length of the support frame 119 except the portion where the wiper motor 120 is mounted, and the fairing 121, etc. are fixed to the support frame 119 with bolts 126-129 and nuts 126a-129a in the above-described manner while maintaining the gap $S_1$.

On the other hand, at a transversely extending front end 123b of the ornamental panel 123 there is formed a downwardly projecting rib 123c, which is formed on the peripheral edge of the front end 123b in correlation with the position of the gap $S_1$, and on both end portions of the peripheral edge of the front end 123b of the ornamental panel 123 are formed projections 123d and 123e as shown in FIG. 4. The projections 123d and 123e, as shown in FIGS. 6 and 7, extend downwardly an amount larger than the extending amount of the rib 123c. On the other hand, in both end portions of the support frame 119 there is formed a hole 119c which extends vertically therethrough, in positions corresponding to the positions of the projections 123d and 123e.

For mounting the ornamental panel 123 to the support frame 119, first the rib 123c is inserted in the gap $S_1$ whereby it is held between the back 121b of the fairing 121 and the upper portion 119b of the support frame 119, and more concretely in this embodiment, between the lower portion 122a of the windshield 122 and the upper portion 119b of the support frame 119. As a result, in the portions of the bolts 126-129 and nuts 126a-129a, the ornamental panel 123 is supported by the support frame 119 without performing the nut tightening operation. When inserting the rib 123c into the gap $S_1$, the projections 123d and 123e are also inserted into the hole 119c and allowed to project onto the back of the support frame 119. Thereafter, at the portions of the projections 123d and 123e, the ornamental panel 123 is fixed to the support frame 119 together with the fairing 121, rubber member 124 and windshield 122 by means of bolts 125, 130 and nuts 125a, 130a. This fixing operation with bolts 125, 130 and nuts 125a, 130a is attained by turning the nuts 125a and 130a because the head portions 125b and 130b are smooth as previously noted. In this case, the support frame 119 is positioned at both end portions of the front end peripheral edge of the ornamental panel 123 as shown in FIG. 4, and these end portions permit easy insertion of a nut tightening tool in the lower surface of the ornamental panel 123 without being impeded by the wiper motor 120 and the goods accommodating recess 123a, and therefore the tightening operation for the nuts 125a and 130a can be performed easily.

Thus, in this embodiment, when fixing the ornamental panel 123 with bolts and nuts to the support frame 119, the nut tightening operation may be performed only at both end portions of the front end peripheral edge of the ornamental panel 123, and the other portions of the panel 123 are supported by insertion of the rib 123c into the gap $S_1$.

Moreover, because the rib 123c is formed substantially throughout the peripheral edge of the front end 123b of the ornamental panel 123, the circumferential portion of the panel 123 and hence the fairing 121 can be made stronger. Furthermore, if the windshield 122 is interposed between the fairing 121 and the ornamental panel 123 as in this embodiment, the insertion of the rib 123c into the gap $S_1$ can afford a junction surface having a favorable external appearance between the windshield 122 and the ornamental panel 123.

Also, it will be understood that in this embodiment the wiper motor 120 is fixed to the windshield 122, through the support frame 119.

Figure 8:
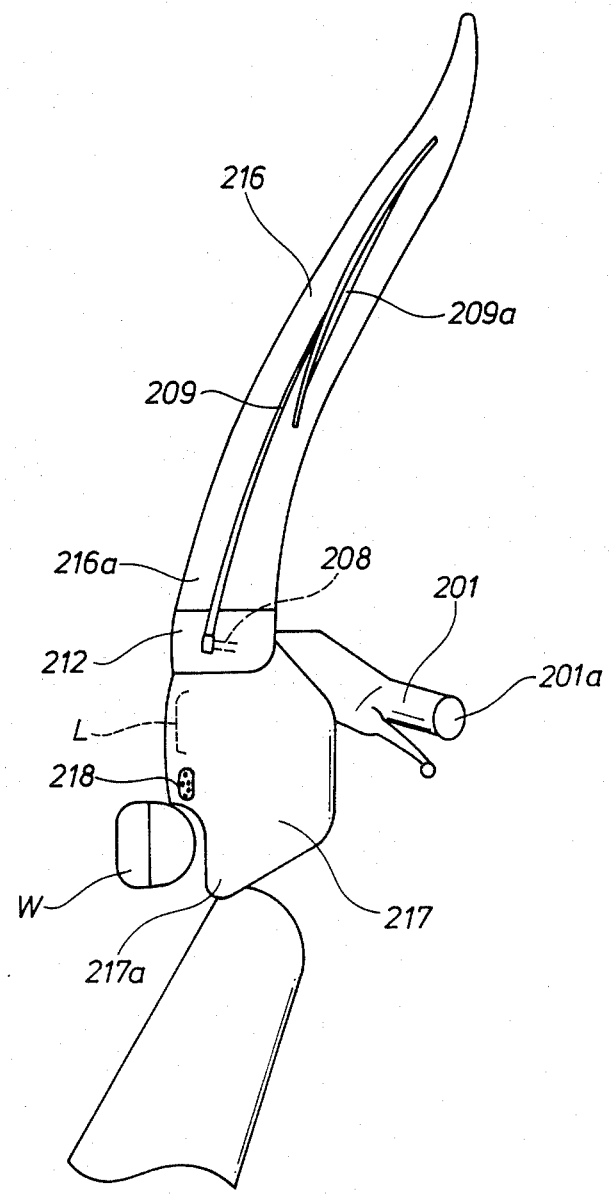
FIG. 8 is a sectional view of a windshield device according to a third embodiment of the present invention.
Figure 9:
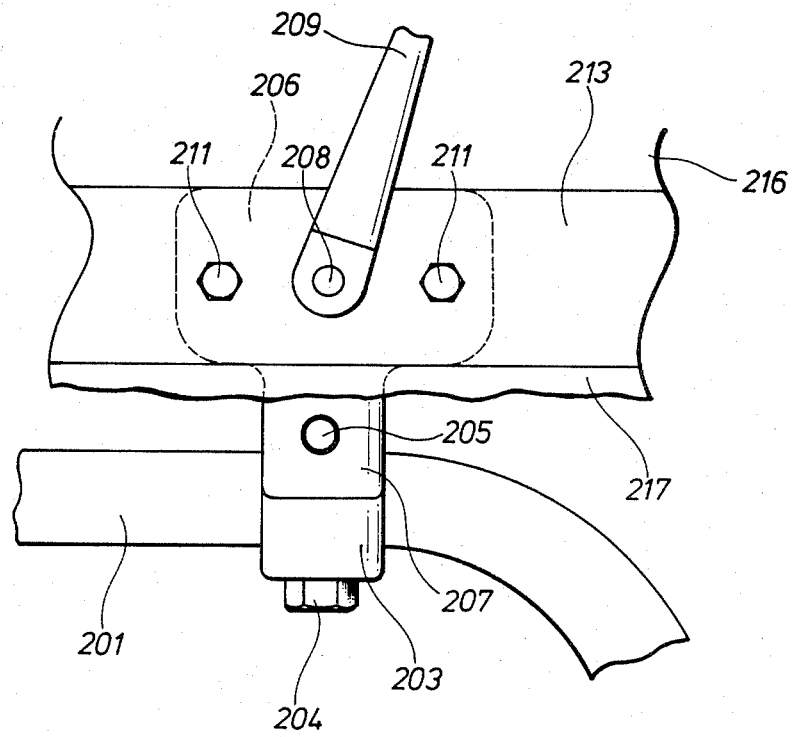
FIG. 9 is an enlarged view of principal portions of the windshield assembly of FIG. 8.
Figure 10:
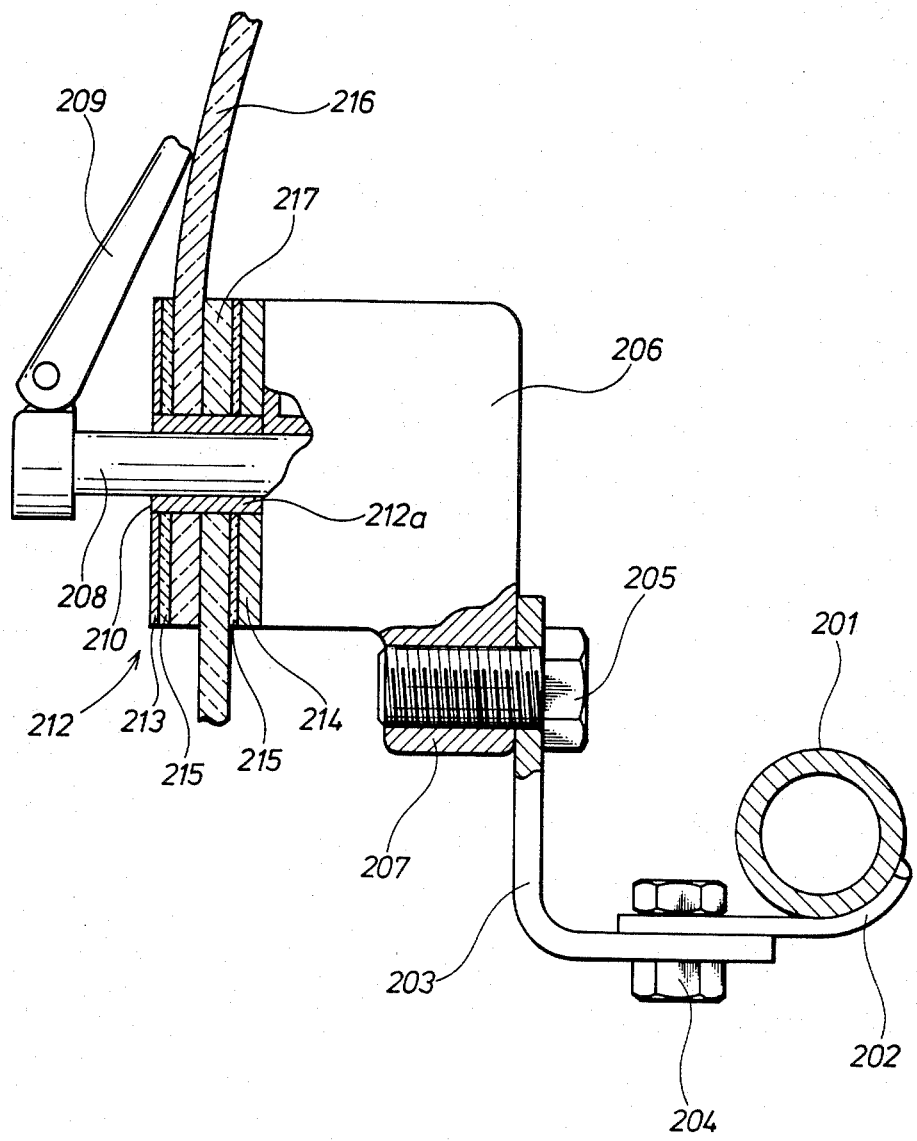
FIG. 10 is a partially cut-away enlarged side view of principal portions of the windshield assembly of FIG. 8.

Referring now to FIGS. 8 through 10, reference numeral 201 shown in FIG. 8 designates a handlebar pipe of a motorcycle. A windshield 216 and a grip cover 217 which covers right and left handlebar grips 201a are fixed firmly to the handlebar pipe 201 while being interconnected up and down by a contact panel 212.

More specifically, the windshield 216 is formed at its lower portion to have a width approximately equal to the handlebar width, and in a side position of the connection 216a with the contact panel 212 there is mounted a wiper arm 209 which is supported by a driving shaft 208, and a wiper blade 209a is connected to the wiper arm 209. The grip cover 217 is dependent at its right and left portions 217a so as to permit the placement of a headlight L therebetween, and the right and left dependent portions 217a are positioned ahead of the handlebar grips 201a and behind blinkers W.

Furthermore, in a predetermined position of each dependent portion 217a there is formed a ventilation slit mechanism 218 which has a plurality of openings capable of being opened and closed.

The windshield 216 and the grip cover 217, as shown in FIG. 10, are fixed to the handlebar pipe 201 through a wiper driving unit 206. The details of such mounting arrangement will be described hereunder.

A bracket 202 is fixed by welding to a predetermined position of the handlebar pipe 201, and to the bracket 202 is firmly fixed a stay 203 having a substantially L-shaped section by means of a bolt and nut 204, the stay 203 being fixed at the other end thereof to a support portion 207 of the wiper driving unit 206 by means of a bolt and nut 205.

On the other hand, the lower end portion of the windshield 216 and the upper end portion of the grip cover 217 are overlapped with each other and in this state firmly connected, by means of bolts and nuts (not shown), to the contact panel 212 which comprises front and rear rubber protection members 215, an outer panel 213 and a mounting panel 214. The thus-connected windshield 216 and grip cover 217 are fixed to the wiper driving unit 206 by means of a pair of bolts and nuts 211 as shown in FIG. 9 in a side position of the contact panel 212.

In the above described fixed portion, as shown in FIG. 10, there is formed an opening 212a which extends through the contact panel 212, windshield 216 and grip cover 217, and a bearing 210 is fitted in the opening 212a, and the driving shaft 208 is carried on the bearing 210 so that it can be pivoted by the wiper driving unit 206.

As will also be apparent from the above description, the windshield 216 and the grip cover 217 interconnected by the contact panel 212 are attached to the handlebar pipe 201 through the wiper driving unit 206.

For mounting the windshield assembly of the above-mentioned construction including the wiper driving unit 206 with respect to the handlebar pipe 201, the windshield 216 and the grip cover 217 are interconnected by the contact panel 212 and the driving shaft 208 is inserted into the bearing 210 of the thus-connected body, then the wiper driving unit 206 is fixed to the connected body with the paired bolts and nuts 211, and the wiper arm 209 is attached to the tip end portion of the wiper shaft 208.

Then, because the stay 203 is fixed with bolt and nut 205 to the support portion 207 of the wiper driving unit 206, the other end of the stay 203 may be fixed with bolt and nut 204 to the bracket 202 which is welded to the handlebar pipe 201.

Although in this embodiment the grip cover 217 is connected to the lower portion of the windshield 216, it is not always necessary to provide the grip cover 217.

Figure 11:
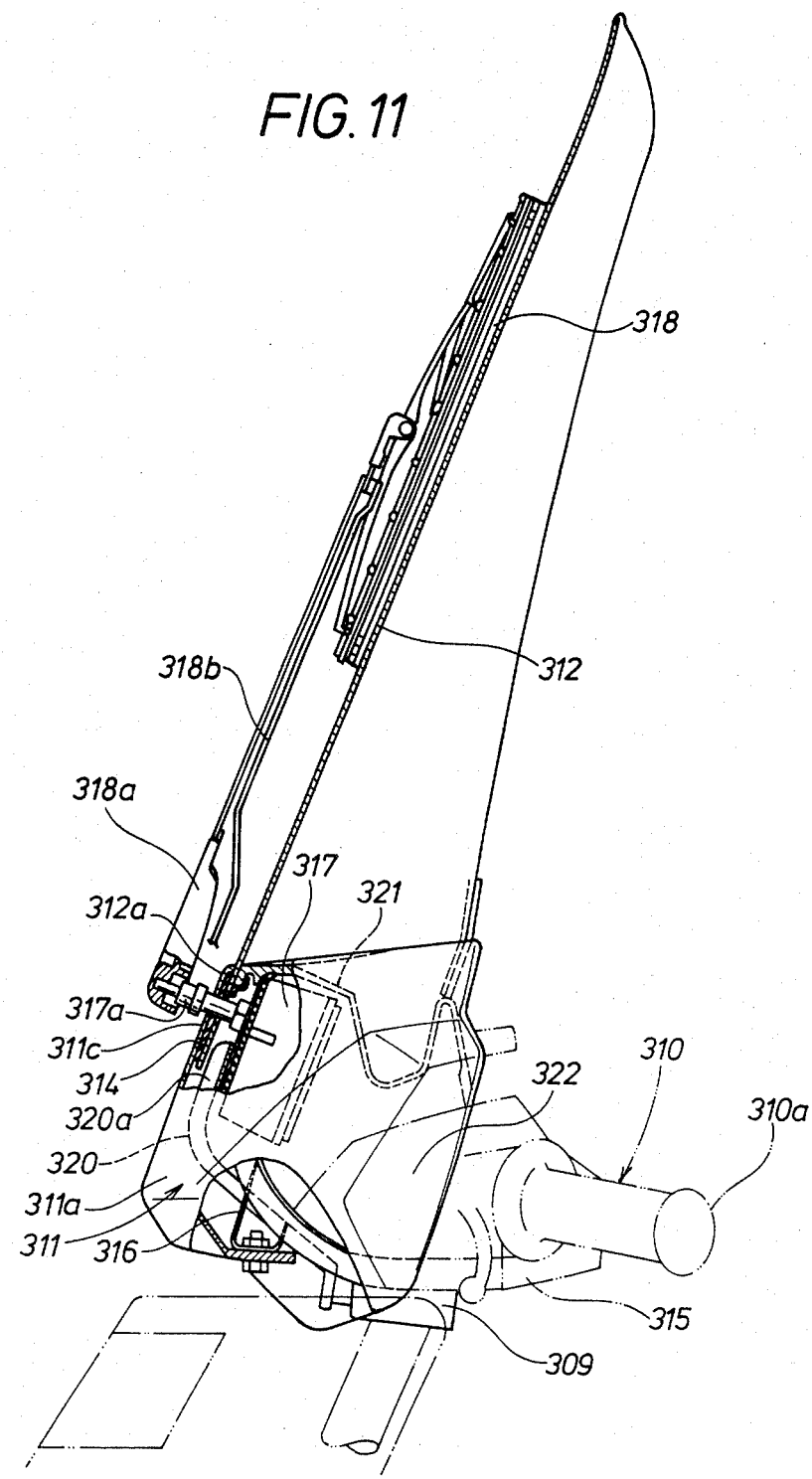
FIG. 11 is a side view of a windshield assembly according to a fourth embodiment of the present invention, partly broken away to show principal portions.
Figure 12:
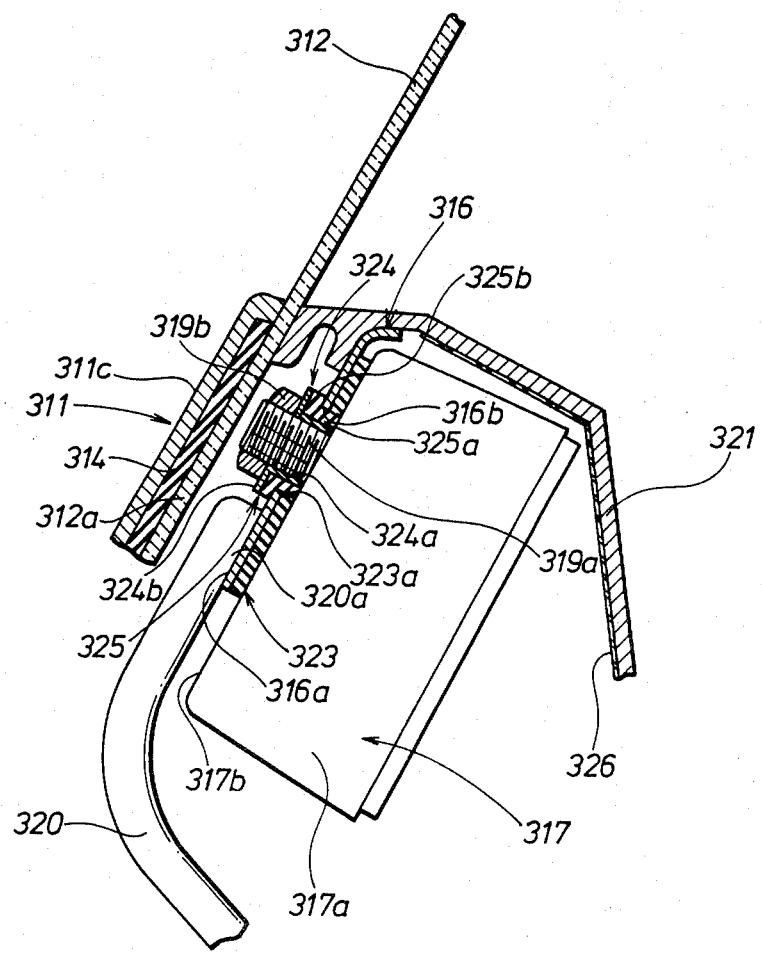
FIG. 12 is an enlarged longitudinal sectional view of principal portions of the windshield assembly of FIG. 11.

Referring now to FIGS. 11 and 12, reference numeral 311 shown in FIG. 11 designates a fairing of a motorcycle, and a windshield 312 which comprises a transparent synthetic resin plate is mounted on the fairing 311 in an upwardly inclined manner. A lower portion 312a of the windshield 312 is overlapped with the back of an upper portion 311c of a transversely central portion 311a of the fairing 311 and is fixed thereto with machine screws (not shown) or the like, with a rubber seal 314 being interposed therebetween. The fairing 311 is supported by a plate-like fairing support frame 316 which is supported by the tip end of each of right and left side stays 315 whose base end portions are fixed to a handlebar pipe 310 in inside positions with respect to right and left grips 310a. Behind the lower portion of the windshield 312 is disposed a wiper motor 317 having a driving shaft 317a and a guide shaft (not shown). The driving shaft 317a and the guide shaft are projected to the front through the overlap of the lower portion 312a of the windshield 312 and the upper portion 311c of the fairing 311, and connected thereto is an arm 318a of a wiper blade 318 and the base end portion of a wiper link 318b, respectively. The arm 318a and the link 318b are adapted to pivot with the lower portion of the windshield 312 as a fulcrum, thereby allowing the blade 318 to wipe the front of the windshield 312. The wiper motor 317, as shown in FIG. 12, is supported at two right and left points on its front by a support portion 316a of the frame 316 which portion is somewhat concaved rearwardly from the central part of the frame, and at the same time, as shown in FIG. 11, a tip end portion 320a of a center stay 320 whose base end portion is fixed to a steering stem bracket 309 is secured to the central part of the front of the motor 317, and thus the motor 317 is supported at a total of three points, whereby it is made possible to suitably bear the reaction force induced by operation of the motor 317 and fix the motor relatively stationarily. The space behind the fairing 311 including the motor 317 is closed by a transversely disposed ornamental panel 321, thereby covering the stays 315, 320 and the motor 317. The panel 321 is disposed above a handlebar cover 322.

As shown in detail in FIG. 12, a mounting bolt 319a projects from a front surface 317b of the body 317a of the wiper motor 317, while in the plate-like support portion 316a of the frame 316 there is formed a mounting hole 316b having a diameter larger than that of the bolt 319a. Between the back of the support portion 316a and the front 317b of the motor 317 is interposed an elastic vibration insulator 323 such as a rubber member, and a mounting hole 323a which matches the mounting hole 316b is formed in the vibration insulator 323. Furthermore, the bolt 319a is loosely fitted in the mounting holes 323a and 316b, and a flanged collar 324 is fitted over the bolt 319a. The collar 324 is provided on its outer periphery with a flanged rubber bushing 325. A tubular portion 325a of the bushing 325 is fitted in the mounting holes 323a and 316b from the outside of the support portion 316a of the frame 316, and a flange portion 325b of the bushing 325 is brought into contact with a surrounding portion of the mounting hole 316b of the support portion 316a. The tubular portion 324a of the collar 324 surrounds the outer periphery of the bolt 319a, and its flange portion 324b faces the outer end face of the flange portion 325b of the bushing 325. A nut 319b is threadedly fitted over the tip portion of the bolt 319a projecting from the collar 324, and is tightened to clamp the collar 324, thereby clamping the wiper motor 317 to the support portion 316a of the frame 316 through the rubber bushing 325 and the vibration insulator 323. Furthermore, a sound absorbing material 326 is adhesively secured to the lower surface of the ornamental panel 321 which covers the wiper motor 317.

What is claimed is:

1. A windshield assembly in a motorcycle having a vehicle body and a handlebar attached to a front part of said vehicle body, said windshield assembly comprising:

a fairing member supported through a first stay member by said vehicle body in front of said handlebar;

an upwardly extending windshield member mounted on said fairing member, said windshield member permitting substantially a front view therethrough;

an ornamental panel member extending rearwardly from a lower portion of said windshield member;

a manual switch mounted on an upper surface of said ornamental panel member;

a motor disposed below said ornamental panel member and operatively connected with said manual switch, said motor being turned on and off by said manual switch, and said motor being fixed to said windshield member and having a substantially longitudinally extending driving shaft;

a wiper operatively coupled to said motor, said wiper being adapted to wipe a front surface of said windshield member;

a second stay member for supporting said motor, said second stay member being fixed to said vehicle body;

said handlebar comprising a substantially transversely extending pipe member, and said fairing member being supported by a support frame member which is fixed to said pipe member through said first stay; and said fairing member being secured at its back to a front surface of said support frame member while defining a gap with respect to an upper portion of said support frame member, and said ornamental panel member being provided at a substantially transversely extending front end thereof with a substantially downwardly projecting rib which is fitted in said gap, and being further provided at both edge portions of said front end with substantially downwardly extending projections which are secured to said support frame member.

2. A windshield assembly according to claim 1, wherein:
said wiper comprises an arm member fixed to a front end of said driving shaft of said motor and pivotable substantially in the transverse direction, and a blade member pivotally secured to said arm member and slidable along the front surface of said windshield member.

3. A windshield assembly according to claim 2, wherein:
the lower portion of said windshield member overlaps an upper portion of said fairing member, and said driving shaft of said motor extends through the lower portion of said windshield member and the upper portion of said fairing member.

4. A windshield assembly according to claim 1, wherein:
said handlebar has a pair of right and left grip portions, said ornamental panel member is disposed between said handlebar and said windshield, and said manual switch is disposed in the vicinity of either one of said right and left grip portions.

5. A windshield assembly according to claim 1, wherein:
said second stay member is fixed at a base end portion thereof to a steering stem bracket, and said motor is supported by a tip end portion of said second stay member and at the same time is fixed to said support frame member.

6. A windshield assembly according to claim 1, wherein the lower portion of said windshield member is held between the back of said fairing member and the front surface of said support frame member.

7. A windshield assembly according to claim 1, wherein a vibration insulator is interposed between said motor and said second stay member.

8. A windshield assembly according to claim 1, wherein a sound absorbing material is attached to a lower surface of said ornamental panel.

9. A windshield assembly according to claim 1, wherein:
said motor, said manual switch and said wiper define a wiper assembly, said wiper assembly being attached to said windshield in advance.

* * * * *